(12) United States Patent
Kikuta (10) Patent No.: US 11,435,720 B2
(45) Date of Patent: Sep. 6, 2022

(54) NUMERICAL CONTROL MACHINE

(71) Applicant: FANUC CORPORATION, Yamanashi (JP)

(72) Inventor: Kazuhiro Kikuta, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 305 days.

(21) Appl. No.: 16/674,134

(22) Filed: Nov. 5, 2019

(65) Prior Publication Data

US 2020/0174447 A1 Jun. 4, 2020

(30) Foreign Application Priority Data

Nov. 29, 2018 (JP) .............................. JP2018-223511

(51) Int. Cl.
*G05B 19/4063* (2006.01)

(52) U.S. Cl.
CPC .................... *G05B 19/4063* (2013.01); *G05B 2219/37337* (2013.01)

(58) Field of Classification Search
CPC ...... G05B 19/4063; G05B 2219/37337; G05B 19/4065; G05B 2219/37616

(Continued)

(56) References Cited

U.S. PATENT DOCUMENTS

| | | | | |
|---|---|---|---|---|
| 5,343,713 A | * | 9/1994 | Okabe .............. | G10K 11/17881 62/296 |
| 2002/0157067 A1 | * | 10/2002 | Yaguchi ................ | G06F 30/367 716/115 |

(Continued)

FOREIGN PATENT DOCUMENTS

| | | |
|---|---|---|
| JP | 2003-308107 A | 10/2003 |
| JP | 2009-251856 A | 10/2009 |

(Continued)

OTHER PUBLICATIONS

An Office Action; "Notice of Reasons for Refusal", mailed by the Japanese Patent Office dated Mar. 2, 2021, which corresponds to Japanese Patent Application No. 2018-223511 and is related to U.S. Appl. No. 16/674,134; with English language translation.

*Primary Examiner* — Rocio Del Mar Perez-Velez
*Assistant Examiner* — Olvin Lopez Alvarez
(74) *Attorney, Agent, or Firm* — Studebaker & Brackett PC (57) ABSTRACT

To provide a numerical control machine that can identify a factor of noise.

A numerical control machine that is connected to a power magnetics cabinet including a plurality of electronic components that potentially generate noise includes: a device information acquisition unit that acquires device information including the relative arrangement and classification of each of the plurality of electronic components; an identification condition information acquisition unit that acquires conditions for identifying electronic components that are factors of noise as identification condition information; a noise detector that detects noise generated in any of the plurality of electronic components and that identifies the electronic components in which noise is generated; and an electronic component identification unit that applies the identification condition information to the device information on the electronic components in which noise is generated to identify the electronic components that are factors of noise from the device information.

6 Claims, 7 Drawing Sheets

(58) Field of Classification Search
USPC .......................................................... 700/14
See application file for complete search history.

(56) References Cited

U.S. PATENT DOCUMENTS

| | | | | |
|---|---|---|---|---|
| 2010/0327899 | A1* | 12/2010 | Imaizumi ............. | G01R 31/002 |
| | | | | 324/756.05 |
| 2013/0145334 | A1* | 6/2013 | Nojima ................. | G06F 30/398 |
| | | | | 716/115 |
| 2014/0181770 | A1* | 6/2014 | Ogawa ................. | G06F 30/398 |
| | | | | 716/112 |
| 2017/0185056 | A1* | 6/2017 | Satou ................... | G05B 13/027 |
| 2019/0329370 | A1* | 10/2019 | Naito ................... | B23Q 11/127 |
| 2020/0154583 | A1* | 5/2020 | Lee ...................... | G01N 27/904 |

FOREIGN PATENT DOCUMENTS

| | | | |
|---|---|---|---|
| JP | 2010004144 A | 1/2010 | |
| JP | 2012-220425 A | 11/2012 | |
| JP | 2015-225392 A | 12/2015 | |
| JP | 2016201687 A | 12/2016 | |
| JP | 2017068324 A | 4/2017 | |
| JP | 6959214 | * 11/2021 | ......... G05B 19/4063 |

\* cited by examiner

NUMERICAL CONTROL MACHINE

This application is based on and claims the benefit of priority from Japanese Patent Application No. 2018-223511, filed on 29 Nov. 2018, the content of which is incorporated herein by reference.

BACKGROUND OF THE INVENTION

Field of the Invention

The present invention relates to a numerical control machine.

Related Art

Numerical control machines that control machines such as machine tools and industrial machines are widely known. Such a numerical control machine is connected to, for example, a power magnetics cabinet, that stores a plurality of types of cables and electronic components.

The plurality of cables and electronic components may generate noise during operation, and this noise may affect other electronic components. When another electronic component is affected by noise, that electronic component may operate incorrectly. When another electronic component in the power magnetics cabinet operates incorrectly due to noise, it is desirable to identify the origin of the noise to uncover the source of the problem. In order to do this, there has been proposed, for example, a device that can identify a device that is affected by noise based on the generation of the noise (see, for example, Patent Documents 1 and 2). There has also been proposed a device that displays a device that is affected by noise on a shape illustration of the power magnetics cabinet (see, for example, Patent Document 3).

Patent Document 1: Japanese Unexamined Patent Application, Publication No. 2016-201687

Patent Document 2: Japanese Unexamined Patent Application, Publication No. 2010-4144

Patent Document 3: Japanese Unexamined Patent Application, Publication No. 2017-68324

SUMMARY OF THE INVENTION

The devices described in Patent Documents 1 to 3 can all identify an electronic component, that is affected by noise and the location of that electronic component. By checking which electronic component is being affected, inspection time when inspecting errors in the machine can be shortened.

However, in order to eliminate noise, it is also necessary to determine why the noise is being generated (factors of noise). The time required to inspect the machine can be shortened by identifying the reason that the noise was generated. Therefore, a numerical control machine that can also identify factors of noise is more desirable.

It is an object of the present invention to provide a numerical control machine that can identify a factor of noise.

(1) The present invention relates to a numerical control machine (for example, a numerical control machine 1 to be described later) that is connected to a power magnetics cabinet (for example, a power magnetics cabinet 100 to be described later) including a plurality of electronic components (for example, electronic components 110 to be described later) that potentially generate noise, the numerical control machine including: a device information acquisition unit (for example, a device information acquisition unit 13 to be described later) that acquires device information including the relative arrangement and classification of each of the plurality of electronic components; an identification condition information acquisition unit (for example, an identification condition information acquisition unit 14 to be described later) that acquires conditions for identifying electronic components that are factors of noise as identification condition information; a noise detector (for example, a noise detector 15 to be described later) that detects noise generated in one or more of the plurality of electronic components and that identifies the electronic components in which noise is generated; and an electronic component identification unit (for example, an electronic component identification unit 17 to be described later) that identifies the electronic components that are factors of noise from the device information on the basis of the device information on the electronic components in which noise is generated and the identification condition information.

(2) In the numerical control machine described in Item (1), the numerical control machine may further include an operating state acquisition unit (for example, an operating state acquisition unit 16 to be described later) that acquires operating states of the electronic components when noise is generated, and the electronic component identification unit may identify the electronic components that are factors of noise from the device information, further taking into considering a noise generation timing.

(3) In the numerical control machine described in Item (2), the identification condition information acquisition unit may acquire, as the identification condition information, identification condition information including a degree of influence on other electronic components, which changes depending on the arrangement of the electronic components and noise generation conditions, and the electronic component identification unit may rank the electronic components that are factors of noise according to the degree of influence included in the identification condition information.

(4) In the numerical control machine described in Item (3), the numerical control machine may further include an output unit (for example, an output unit 18 to be described later) that outputs the device information on the electronic components identified by the electronic component identification unit to an external device.

(5) In the numerical control machine described in item (4), the output unit may display the device information on the identified electronic components with a different display attribute to that of other electronic components.

(6) In the numerical control machine described in item (4) or (5), the output unit may further output the noise generation conditions.

According to the present invention, there can be provided a numerical control machine that can identify a factor of noise.

DETAILED DESCRIPTION OF THE INVENTION

A numerical control machine 1 according to an embodiment of the present invention is described below with reference to FIGS. 1 to 7. Before describing the numerical control machine 1 according to this embodiment, locations at which noise is generated and factors of noise in a power magnetics cabinet 100 that is connected to the numerical control machine 1 are described with reference to FIG. 1.

Figure 1:
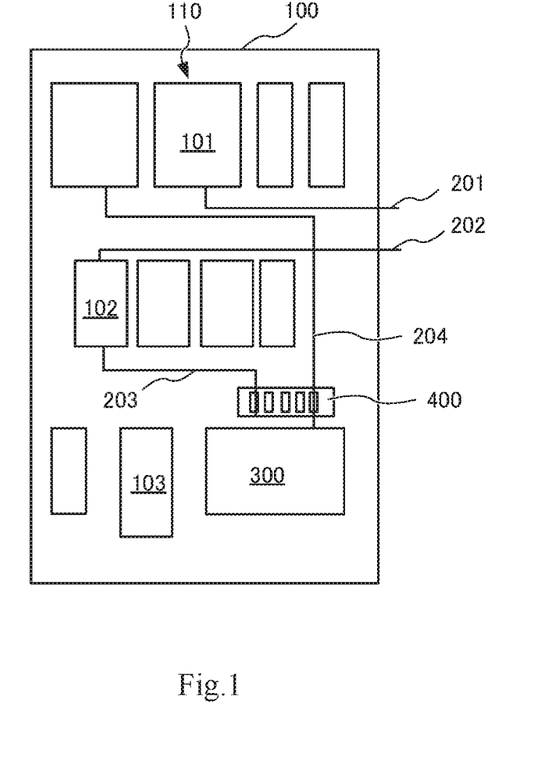
FIG. 1 is a schematic diagram for illustrating a power magnetics cabinet, that is connected to a numerical control machine according to an embodiment of the present invention.

The power magnetics cabinet 100 includes a plurality of electronic components (hereinafter, simply referred to as "devices") and cables that are connected to the devices. These devices and cables are laid out on a substrate. For example, as illustrated in FIG. 1, the power magnetics cabinet 100 includes a first device 101, a second device 102 and a third device 103 as potential factors of noise. The power magnetics cabinet 100 further includes a first cable 201, a second cable 202 and a third cable 203 as potential factors of noise, and a noise receiver 300 that may be affected by noise. The power magnetics cabinet 100 also includes a ground plane 400 that serves as an earth for all the devices. The first device 101, the second device 102 and the third device 103 are merely examples and are not limited to the layout illustrated in FIG. 1. The same applies to the first cable 201, the second cable 202 and the third cable 203. The noise receiver 300 and the ground plane 400 are also exemplary components.

In this embodiment, for example, the first device 101 is connected to the first cable 201. The second device 102 is connected to the second cable 202 and the third cable 203. The second device 102 is also connected to a common earth (ground plane 400) via the third cable 203. The noise receiver 300 is connected to another device via a fourth cable 204. In this example, the fourth cable 204 is disposed partly in parallel with the first cable 201 and the second cable 202.

If noise is generated in the noise receiver 300, the device that was a factor causing the noise can be identified for each of several different factors. These factors include the distance between the noise receiver 300 and each of the first device 101, the second device 102 and the third device 103, the parallel distance between the fourth cable 204 and other cables, the proximity between the fourth cable 204 and other cables, voltage applied to the first cable 201 and the second cable 202, current that flows through the first cable 201 and the second cable 202, and positioning of the earth wire. In the following description, the devices and cables in the power magnetics cabinet 100 may be collectively referred to as "electronic components 110".

Figure 2:
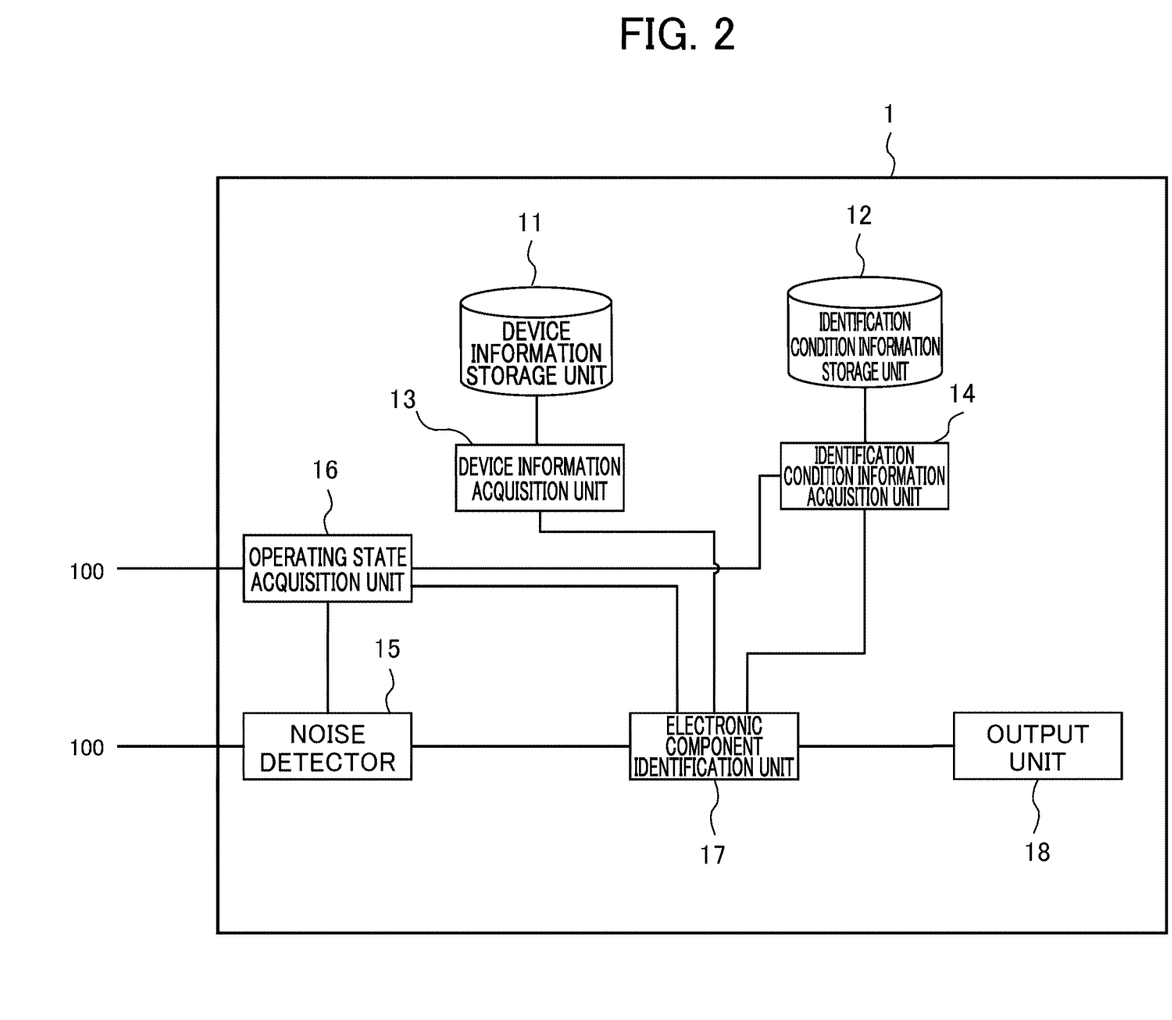
FIG. 2 is a block diagram for illustrating the numerical control machine according to the embodiment.

Next, the numerical control machine 1 according to this embodiment is described. As illustrated in FIG. 2, the numerical control machine 1 according to this embodiment includes a device information storage unit 11, an identification condition information storage unit 12, a device information acquisition unit 13, an identification condition information acquisition unit 14, a noise detector 15, an operating state acquisition unit 16, an electronic component identification unit 17 and an output unit 18. The numerical control machine 1 is a device that is connected to the power magnetics cabinet 100, which includes a plurality of the electronic components 110 that may generate noise.

The device information storage unit 11 is, for example, a secondary storage medium such as a hard disk. The device information storage unit 11 stores device information including the relative arrangement and classification of the plurality of electronic components 110. The device information storage unit 11 stores, for example, information (electronic components 110) on the classification of each electronic component 110, cable routes (origin, destination, coordinates of cable bends) and connections, and other information as the device information. The device information storage unit 11 stores, for example, device information including the arrangement and classification of each electronic component 110 in the power magnetics cabinet 100 illustrated in FIG. 1. In this embodiment, the device information storage unit 11 stores device information including the arrangement and classification of the first to third devices 101 to 103, the first to fourth cables 201 to 204, and the noise receiver 300 as the device information.

The identification condition information storage unit 12 is, for example, a secondary storage medium such as a hard disk. The identification condition information storage unit 12 stores conditions for identifying electronic components 110 that are factors of noise as identification condition information. For example, the identification condition information storage unit 12 stores information on electronic components 110 that are likely to be sources of noise (actuators such as motors, amplifiers and electromagnetic contactors) and the cables that are connected to those electronic components 110 (first cable 201, second cable 202 and third cable 203) as the identification condition information. The identification condition information storage unit 12 also stores identification condition information including the degree of influence on other electronic components 110, which changes depending on the arrangement and noise generation conditions of the electronic components 110, as the identification condition information. In this embodiment, the noise generation condition includes at least, for example, distance between devices, parallel distance between cables, proximity between cables, voltage applied to cables, current that flows through cables, and positioning of the earth wire. The identification condition information storage unit 12 stores the degree of influence on the noise generation conditions for the electronic components 110 that are likely to be a source of noise to the noise receiver 300 as the identification condition information.

The device information acquisition unit 13 acquires the device information. The device information acquisition unit 13 acquires the device information by, for example, reading out the device information from the device information storage unit 11.

The identification condition information acquisition unit 14 acquires the identification condition information. The identification condition information acquisition unit 14 acquires the identification condition information by, for example, reading out the identification condition information from the identification condition information storage unit 12.

The noise detector 15 detects noise generated in one more of the plurality of electronic components 110 and identifies the electronic component 110 in which noise is generated.

For example, the noise detector 15 identifies an electronic component 110 that has output an error due to being affected by noise as the electronic component 110 in which noise is generated.

Figure 3:
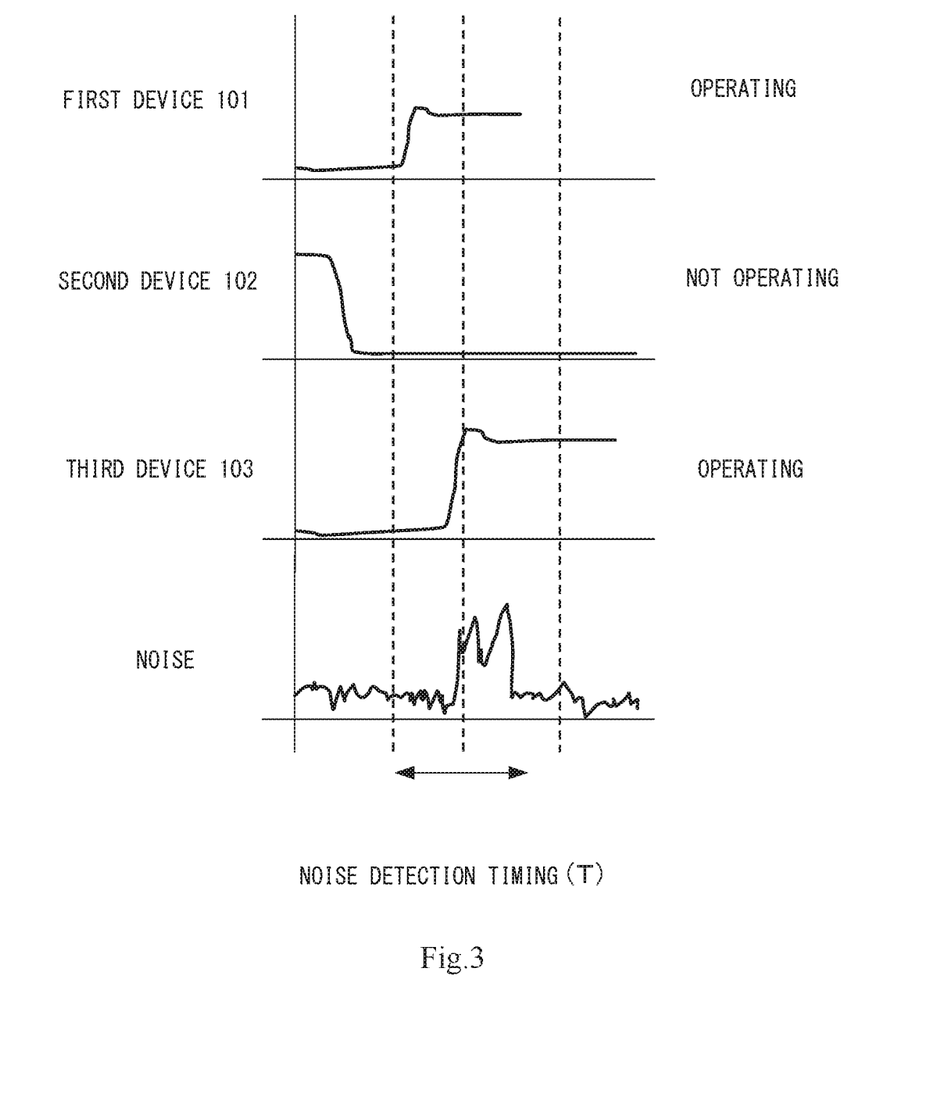
FIG. 3 is a schematic diagram for showing the relationship between noise detected by the numerical control machine according to the embodiment and operating states of devices.

The operating state acquisition unit 16 is connected to the noise detector 15 and the identification condition information acquisition unit 14. The operating state acquisition unit 16 acquires a trigger relating to the generation of noise from the noise detector 15. The operating state acquisition unit 16 also acquires the identification condition information from the identification condition information acquisition unit 14. Further, the operating state acquisition unit 16 acquires the operating states of electronic components 110 that have been assigned an identification condition. For example, as illustrated in FIG. 3, the operating state acquisition unit 16 acquires the operating states of the first device 101, the second device 102 and the third device 103 between noise detection timings (times T). In the example illustrated in FIG. 3, the operating state acquisition unit 16 acquires a state in which the first device 101 and the third device 103 are operating during the noise detection timing (time).

The electronic component identification unit 17 receives the device information from the device information acquisition unit 13. The electronic component identification unit 17 acquires the identification condition information from the identification condition information acquisition unit 14. The electronic component identification unit 17 acquires information that identifies the noise receiver 300 from the noise detector 15. Further, the electronic component identification unit 17 acquires the operating states of the devices included in the identification condition information from the operating state acquisition unit 16. The electronic component identification unit 17 identifies electronic components 110 that are factors of noise from the device information on the basis of the device information and the identification condition information on the electronic components 110 in which noise is generated (noise receiver 300). The electronic component identification unit 17 also identifies electronic components 110 that are factors of noise from the device information by taking into consideration a noise generating timing. For example, the electronic component identification unit 17 identifies only operating devices among the electronic components 110 that are factors of noise from the device information. In this embodiment, the electronic component identification unit 17 identifies the first device 101 and second device 102 and the first cable 201, second cable 202 and third cable 203 from the device information.

The electronic component identification unit 17 ranks the electronic components 110 that are factors of noise according to the degree of influence included in the identification condition information. For example, the electronic component, identification unit 17 ranks the electronic components 110 included in the identification condition information for each of the following conditions: distance between devices, parallel distance between cables, proximity between cables, voltage applied to cables, current that flows through cables, and positioning of the earth wire. Now, there is described results of determination regarding the degree of influence based on each noise generation condition in the power magnetics cabinet 100 illustrated in FIG. 1, taking into consideration the operating states illustrated in FIG. 3. In FIG. 3, the second device 102 was not, operating when noise is generated. Therefore, the second device 102 is not counted as a factor of noise.

Figure 4:
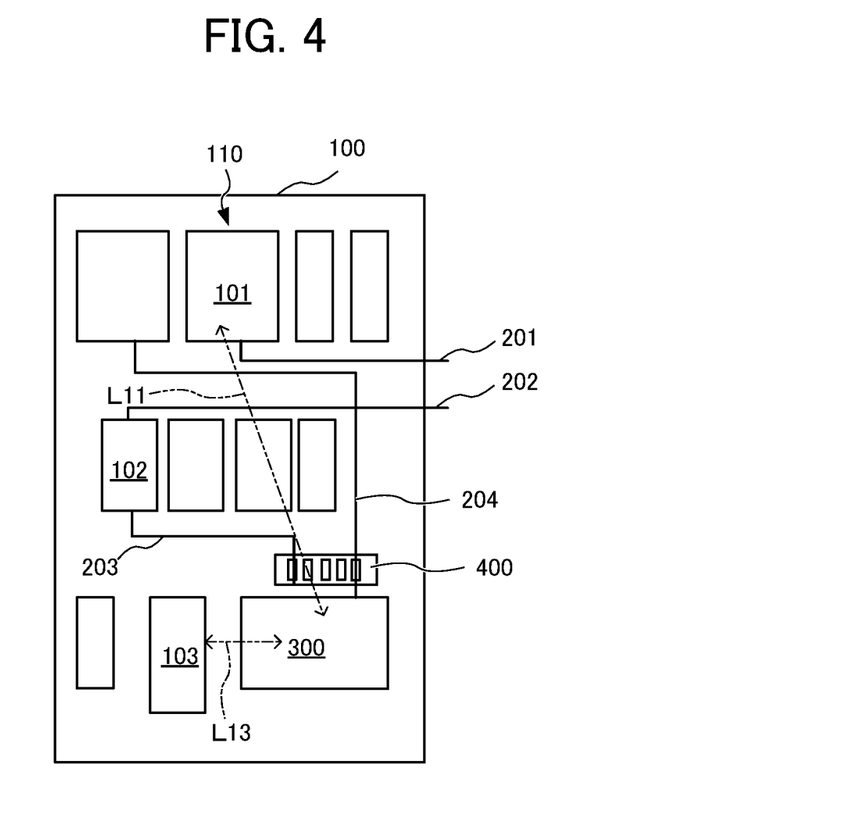
FIG. 4 is a schematic diagram in which a device that is a factor of noise is extracted by the numerical control machine according to the embodiment on the basis of distance between devices.

(Distance Between Devices)

As illustrated in FIG. 4, among the first device 101 and the third device 103 included in the identification condition information, the third device 103 is closer to the noise receiver 300 (distance L11> distance L13). Radiation noise attenuates in accordance with the spatial distance between devices. As such, an electronic component that is close to a factor of noise is likely to be affected by that noise. The electronic component identification unit 17 ranks the third device 103 and the first device 101 in that order that are factors of noise in terms of distance between devices.

Figure 5:
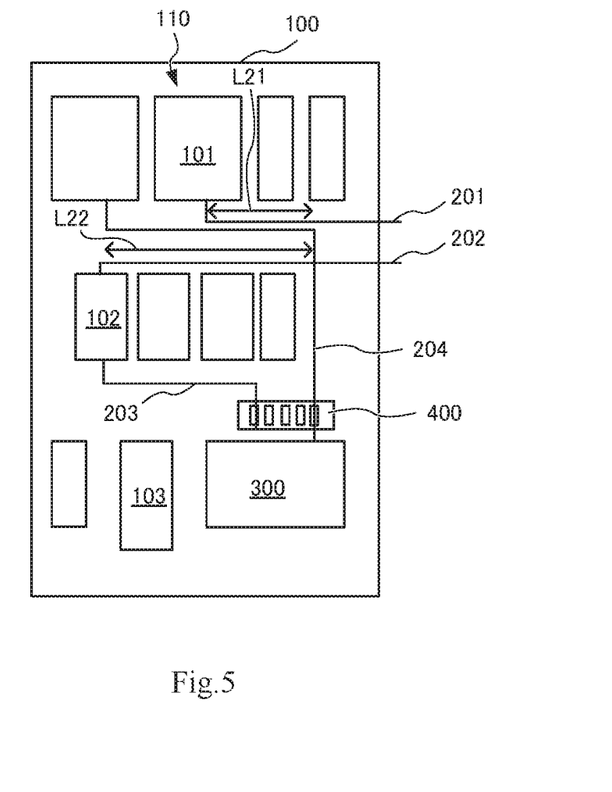
FIG. 5 is a schematic diagram in which a cable that is a factor of noise is extracted by the numerical control machine according to the embodiment on the basis of the parallel relationship between cables.

(Parallel Distance Between Cables)

As illustrated in FIG. 5, among the first cable 201 and the second cable 202 included in the identification condition information, the parallel distance between the fourth cable and the second cable 202 is longer than the parallel distance between the fourth cable 204 and the first cable 201 (distance L21<distance L22). The noise receiver 300 is more likely to be affected by noise when cables have a longer parallel distance to each other. The electronic component identification unit 17 ranks the second cable 202 and the first cable 201 in that order that are factors of noise in terms of parallel distance between cables.

Figure 6:
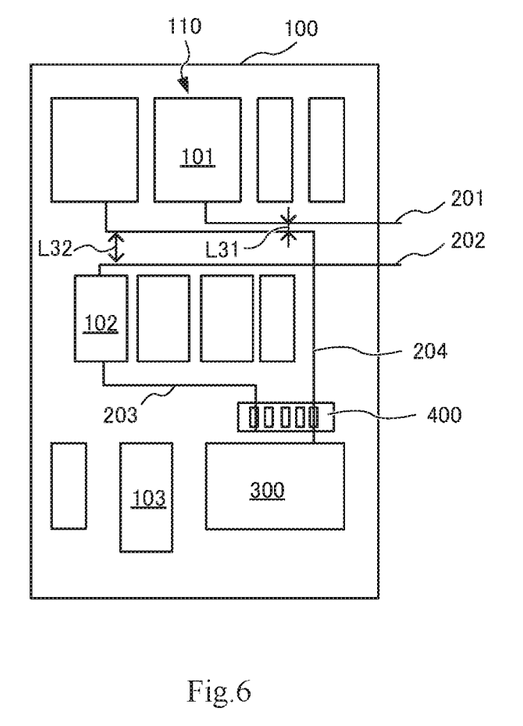
FIG. 6 is a schematic diagram in which a cable that is a factor of noise is extracted by the numerical control machine according to the embodiment on the basis of distance between cables.

(Proximity Between Cables)

As illustrated in FIG. 6, among the first cable 201 and the second cable 202 included in the identification condition information, the first cable 201 is arranged closer to the fourth cable 204 (distance L31>L32). The noise receiver 300 is more likely to be affected by noise when cables are closer to each other. The electronic component identification unit 17 ranks the first cable 201 and the second cable 202 in that order that are factors of noise in terms of proximity between cables.

(Voltage and Current)

The noise receiver 300 is more likely to be affected by noise by whichever of the first cable 201 or the second cable 202 included in the identification condition information has a higher voltage value or current value of power passing through the cable. If the voltage value and current value of the first cable 201 are higher than the voltage value and current value of the second cable 202, the electronic component identification unit 17 ranks the first cable 201 and the second cable 202 in that order that are factors of noise in terms of voltage and current.

Figure 7:
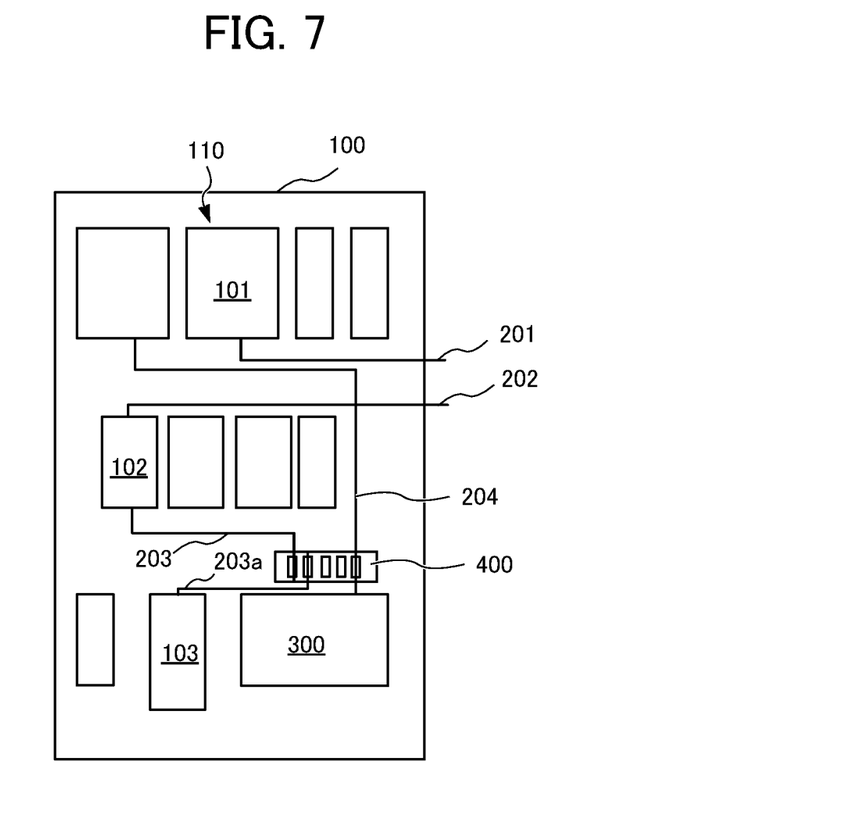
FIG. 7 is a schematic diagram in which a cable that is a factor of noise is extracted by the numerical control machine according to the embodiment on the basis of positioning of the earth wire.

(Positioning of Earth Wire)

As illustrated in FIG. 7, among the first device 101 and the third device 103 included in the identification condition information, only the third device 103 is connected to the ground plane 400, which is used in common with the noise receiver 300, via the third cable 203*a*. Noise generated by the third device 103 may be routed by the third cable 203*a*, the ground plane 400 or the fourth cable 204. The electronic component identification unit 17 determines that the third device 103 is a factor of noise in terms of positioning of the earth wire. The electronic component identification unit 17 outputs the device information and information on the noise receiver 300 and factors of noise for each noise generation condition.

The output unit 18 acquires the device information and information on the noise receiver 300 and factors of noise for each noise generation condition from the electronic component identification unit 17. The output unit 18 outputs device information on the electronic components 110 identified by the electronic component identification unit 17 to an external device (for example, a display (not shown)). For example, the output unit 18 displays the device information on the identified electronic components 110 with a display attribute different to that of other electronic components 110. More specifically, the output unit 18 outputs information relating to the location of the devices in the power magnetics cabinet 100 and displays the device information on the electronic components 110 (devices determined that are factors of noise) ranked for each noise generation condition in a different color to that of other electronic components 110. The output unit 18 displays the electronic components 110 in their ranked order in different colors for each noise generation condition.

Next, the flow of processing according to this embodiment is described. First, when the noise detector 15 detects noise, the noise detector 15 identifies the noise receiver 300. The operating state acquisition unit 16 acquires the identification condition information and acquires the operating states of the devices that were operating when noise was generated and that may generate noise. The operating state acquisition unit 16 sends information on the electronic components that were operating when noise was generated to the electronic component identification unit 17.

Then, for each noise generation condition included in the identification condition information, the electronic component identification unit 17 outputs the electronic components that are included in the identification condition information and that were operating when noise was generated to the output unit 18 in descending order of possibility of being a factor of noise. The electronic component identification unit 17 also outputs the device information to the output unit 18. The output unit 18 displays the electronic components in descending order of possibility of being a factor of noise for each noise generation condition according to the location of the electronic components on the basis of the device information and the ranking information.

The following effects can be achieved with the numerical control machine 1 according to the embodiment of the present invention.

(1) The numerical control machine 1 is connected to a power magnetics cabinet 100 including a plurality of electronic components 110 that potentially generate noise, and includes: a device information acquisition unit 13 that acquires device information including the relative arrangement and classification of each of the plurality of electronic components 110; an identification condition information acquisition unit 14 that acquires conditions for identifying electronic components 110 that are factors of noise as identification condition information; a noise detector 15 that detects noise generated in one or more of the plurality of electronic components 110 and that identifies the electronic components 110 in which noise is generated; and an electronic component identification unit 17 that identifies the electronic components 110 that are factors of noise from the device information on the basis of the device information on the electronic components 110 in which noise is generated and the identification condition information. With this configuration, factors of noise can be identified.

(2) The numerical control machine 1 further includes the operating state acquisition unit 16 that acquires operating states of the electronic components 110 when noise is generated, and the electronic component identification unit 17 identifies the electronic components 110 that are factors of noise from the device information, further taking into considering a noise generation timing. With this configuration, noise factors can be identified while excluding devices that are less likely to be a noise factor when noise is generated. Therefore, processing for identifying noise factors can be simplified.

(3) The identification condition information acquisition unit 14 acquires, as the identification condition information, identification condition information including a degree of influence on other electronic components 110, which changes depending on the arrangement of the electronic components 110 and noise generation conditions, and the electronic component identification unit 17 ranks the electronic components 110 that are factors of noise according to the degree of influence included in the identification condition information. With this configuration, it is possible to identify electronic components 110 that are likely to be noise factors, which makes it easier to identify noise generation factors during actual investigation.

(4) The numerical control machine 1 further includes an output unit 16 that outputs the device information on the electronic components 110 identified by the electronic component identification unit 17 to an external device. With this configuration, it is easier to check which electronic components 110 are factors of noise.

(5) The output unit 18 displays the device information on the identified electronic components 110 with a different display attribute to that of other electronic components 110. With this configuration, it is easier to check which electronic components 110 are factors of noise.

(6) The output unit 18 further outputs the noise generation conditions. With this configuration, the electronic components 110 that are factors of noise can be output for each noise generation condition. Therefore, the electronic components 110 to be investigated for each noise generation condition can be narrowed down and it is easier to uncover the source of the noise.

Desired embodiments of the numerical control machine according to the present invent on have been described, but the present invention is not limited to the above-described embodiments and may be changed as required. Any modifications or improvements made within the scope of achieving the object of the present invention are included in the present invention. For example, in the above-described embodiment, the electronic component identification unit 17 ranks the electronic components 110 that are factors of noise, but the electronic component identification unit 17 may not rank the electronic components 110. In the above-described embodiment, the output unit 18 displays the electronic components that are factors of noise, but the output unit 18 is not limited to this configuration. For example, the output unit 18 may output information on the electronic components to another terminal or device in the form of data.

In the above-described embodiment, the device information acquisition unit 13 acquires the device information from the device information storage unit 11, but the device information acquisition unit 13 is not limited to this configuration. For example, the device information acquisition unit 13 may acquire the device information from another device (not shown) over a network or other connection. Similarly, the identification condition information acquisition unit 14 may acquire the identification condition information from another device (not shown) over a network or other connection.

In the above-described embodiment, the numerical control machine 1 includes the operating state acquisition unit 16, but the numerical control machine 1 is not limited to this configuration and may not include the operating state acquisition unit 16. If adopting such a configuration, the electronic component identification unit 17 may identify electronic components 110 that are factors of noise among electronic components 110 that have the potential to generate noise, without taking into consideration the operating states of the electronic components 110.

EXPLANATION OF REFERENCE NUMERALS 1 numerical control machine
13 device information acquisition unit 14 identification condition information acquisition unit
15 noise detector
16 operating state acquisition unit
17 electronic component identification unit
18 output unit
100 power magnetics cabinet
110 electronic component

What is claimed is:

1. A numerical control machine that is connected to a power magnetics cabinet including a plurality of electronic components that potentially generate electromagnetic noise, a plurality of cables connected to the electronic components that potentially generate electromagnetic noise, and a noise sensor configured to receive the electromagnetic noise from the electronic components and the cables, the numerical control machine being configured to:
   acquire device information including a relative position and classification of each of the electronic components, the cables, and the noise sensor arranged in the power magnetics cabinet;
   acquire, as identification condition information, types of the electronic components that are potential factors of the electromagnetic noise, characteristics of the cables connected to the electronic components that are potential factors of the electromagnetic noise, and a degree of influence according to the types of the electronic components that are potential factors of the electromagnetic noise and the characteristics of the cables connected to the electronic components that are potential factors of the electromagnetic noise;
   detect the electromagnetic noise generated in the electronic components by using the noise sensor;
   rank the electronic components that are potential factors of the electromagnetic noise and the cables that are potential factors of the electromagnetic noise, with respect to the relative positions and the classifications of the electronic components, the cables, and the noise sensor indicated by the device information, by:
      applying the types of the electronic components that are potential factors of the electromagnetic noise, the characteristics of the cables connected to the electronic components that are potential factors of the electromagnetic noise, and the degree of influence according to the types of the electronic components that are potential factors of the electromagnetic noise and the characteristics of the cables connected to the electronic components that are potential factors of the electromagnetic noise, as indicated by the identification information; and
   output the device information on the electronic components and the cables ranked for each electromagnetic noise generation condition.

2. The numerical control machine according to claim 1, further configured to:
   acquire operating states of the electronic components when the electromagnetic noise is generated, and
   rank the electronic components and the cables that are potential factors of the electromagnetic noise from the device information, among the electric components and the cables that are potential factors of the electromagnetic noise in operating at a noise generation timing.

3. The numerical control machine according to claim 1, wherein the output unit displays the device information on the identified electronic components with a different display attribute from that of other electronic components.

4. The numerical control machine according to claim 1, wherein the output unit further outputs the electromagnetic noise generation conditions.

5. The numerical control machine according to claim 1, further configured to display the device information of the electronic components and the cables ranked for each electromagnetic noise generation condition.

6. The numerical control machine according to claim 1, further configured to rank the cables included in the identification condition information for parallel distance between the cables.

* * * * *